(12) United States Patent
McCabe (10) Patent No.: US 7,119,809 B1
(45) Date of Patent: Oct. 10, 2006

(54) PARALLEL ARCHITECTURE FOR GRAPHICS PRIMITIVE DECOMPOSITION

(75) Inventor: Daniel H. McCabe, Bellevue, WA (US)

(73) Assignee: S3 Graphics Co., Ltd., Grand Cayman (KN)

( * ) Notice: Subject to any disclaimer, the term of this patent is extended or adjusted under 35 U.S.C. 154(b) by 7 days.

(21) Appl. No.: 09/858,354

(22) Filed: May 15, 2001

Related U.S. Application Data (60) Provisional application No. 60/204,203, filed on May 15, 2000.

(51) Int. Cl.
  *G06T 1/20* (2006.01)
  *G06T 15/40* (2006.01)
(52) U.S. Cl. ...................... 345/506; 345/422
(58) Field of Classification Search ............... 345/629, 345/501, 506, 422
  See application file for complete search history.

(56) References Cited

U.S. PATENT DOCUMENTS

| | | | |
|---|---|---|---|
| 5,287,438 A | | 2/1994 | Kelleher |
| 5,392,392 A | * | 2/1995 | Fischer et al. .............. 345/501 |
| 5,416,893 A | | 5/1995 | Herrell et al. |
| 5,579,455 A | * | 11/1996 | Greene et al. .............. 345/422 |
| 5,600,763 A | * | 2/1997 | Greene et al. .............. 345/420 |
| 5,963,210 A | | 10/1999 | Lewis et al. |
| 5,995,439 A | * | 11/1999 | Watanabe et al. ...... 365/230.03 |
| 6,057,855 A | | 5/2000 | Barkans |
| 6,236,404 B1 | * | 5/2001 | Iimura et al. .............. 345/427 |
| 6,329,996 B1 | * | 12/2001 | Bowen et al. .............. 345/506 |
| 6,359,623 B1 | * | 3/2002 | Larson .............. 345/501 |
| 6,407,736 B1 | | 6/2002 | Regan |
| 6,480,205 B1 | * | 11/2002 | Greene et al. .............. 345/631 |
| RE38,078 E | * | 4/2003 | Duluk, Jr. .............. 345/422 |

OTHER PUBLICATIONS

M. D. McCool, "Incremental and Hierarchical Hilbert Order Edge Equation Polygon Rasterization", Proceedings of the ACM SIGGRAPH/Eurographics workshop on on Graphics hardware, Aug. 2001, Los Angeles, CA, pp. 65-72.*

Ned Greene, "Hierarchical polygon tiling with coverage masks", Proceedings of the 23rd annual conference on Computer graphics and interactive techniques, p. 65-74, Aug. 1996.*

(Continued)

*Primary Examiner*—Kee M. Tung
*Assistant Examiner*—Jin-Cheng Wang
(74) *Attorney, Agent, or Firm*—Carr & Ferrell LLP (57) ABSTRACT

A parallel architecture for determining pixels inside a graphics primitive is provided. The architecture is a pipeline structure having a predetermined number of sequential logic circuits connected in series followed by a predetermined number of parallel logic circuits arranged in a pyramid structure. Each sequential logic circuit uses arithmetic edge functions corresponding to edges of a graphics primitive to determine whether a polygonal portion of a raster image is inside the graphics primitive. If the polygonal portion is at least partly inside the graphics primitive, the sequential logic circuit divides the polygonal portion into a predetermined number of subportions and computes descriptors (e.g., vertices and translated edge functions) for each subportion sequentially. Descriptors are then transferred sequentially to the next stage. Each parallel logic circuit performs the same functions as that of a sequential logic circuit except that a parallel logic circuit computes descriptors of the subportions in parallel and transfers them to the next stage in parallel.

1 Claim, 9 Drawing Sheets

OTHER PUBLICATIONS

H. Fuchs, et al., "Fast spheres, shadows, textures, transparencies, and imgage enhancements in pixel-planes", Proceedings of the 12th annual conference on Computer graphics and interactive techniques, pp. 111-120, Jul. 1985.*

H. Fuchs, et. al., "Pixel-planes 5: a heterogeneous multiprocessor graphics system using processor-enhanced memories", ACM SIGGRAPH Computer Graphics, Computer Graphics, pp. 79-88, Jul. 1989, vol. 23, No. 3.*

U.S. Appl. No. 09/858,306, Daniel H. McCabe, Graphics Primitive Decomposition Using Edge Functions and Recursive Tile Subdivision, filed May 15, 2001.

M. Olano, T. Greer, "Triangle Scan Conversion Using 2D Homogeneous Coordinates," Proceedings of the 1997 SIGGRAPH/Eurographics Workshop on Graphics Hardware, Aug. 1997, pp. 89-95.

* cited by examiner

PARALLEL ARCHITECTURE FOR GRAPHICS PRIMITIVE DECOMPOSITION

CROSS-REFERENCES TO RELATED APPLICATIONS

This application claims the benefit of Provisional Patent Application Ser. No. 60/204,203, filed on May 15, 2000, entitled "Parallel Architecture for Graphics Primitives Decomposition," which is incorporated herein by reference. The present application also is related to and incorporates by reference co-pending U.S. patent application Ser. No. 09/858,306, by Daniel H. McCabe, entitled "Graphics Primitive Decomposition Using Edge Functions and Recursive Tile Subdivision", filed on May 15, 2001.

BACKGROUND OF THE INVENTION

1. Field of the Invention

The present invention relates generally to computer graphics and more particularly to graphics primitive rasterization.

2. Description of Related Art

In graphic systems, graphic objects are typically constructed with combinations of graphics primitives in a geometrical model definition stage. Graphics primitives may include lines, characters, areas such as triangles and ellipses, and solid or patterned shapes such as polygons, spheres, cylinders and the like. These primitives may be connected together to form two or three-dimensional geometric models of a desired graphics object or scene. Since each graphics primitive of a geometric model is represented by a data structure, the geometric model is a linked data structure stored in memory. Further, each graphics primitive is associated with proper attributes to give the primitive a desired color, shade, texture and transparency.

In raster graphic systems, a scene having one or more graphics objects may be displayed as a raster image made up of picture elements (pixels) organized into horizontal rows (i.e., horizontal scan lines) representing an entire display screen area. Depending on desired resolution, color, brightness and other factors, each pixel may be represented by one or more bits. Similarly, a raster display screen also has pixels organized into horizontal rows to form a grid or array of pixels which may emit a range of colored light to display an image. Thus, in order to display a graphics object, data associated with display screen pixel locations that correspond to graphics primitive pixels must be computed based on information about each primitive. The information includes data related to the display screen pixel coordinates $(X_s, Y_s)$, pixel depth (Z), pixel color space (e.g., R, G, B, YIQ, HSV), pixel transparency, and pixel image texture coordinate space (U, V). After rasterization, pixel data corresponding to graphics primitives are stored in a frame buffer usually implemented as arrays of video random access memories (VRAMs). Subsequently, a display controller retrieves the stored rasterized pixel data to intensify corresponding display screen pixel locations, thereby tracing out graphics primitives on the display screen.

The rasterization process generally involves two tasks: graphics primitive decomposition and computation. In the first task, display screen pixels, which correspond to data points inside each graphics primitive image, are identified. In the second task, data related to display screen pixel appearance are computed. Such data include display information such as visible portions of a primitive as viewed from a synthetic camera's point of view and color assignments to each display screen pixel.

Generally, there are two rasterization approaches: object order and image order. In the object order rasterization approach, each primitive is decomposed into pixels. Based on color and visibility of the primitive at each pixel, pixel data in the frame buffer including z-buffer is updated. Alternatively, in the image order rasterization approach, each pixel in the raster image is checked to determine whether any primitives cover the pixel. For each primitive covering the pixel, the primitive's contribution in terms of color, shading, transparency and texture is then computed.

Figure 1:
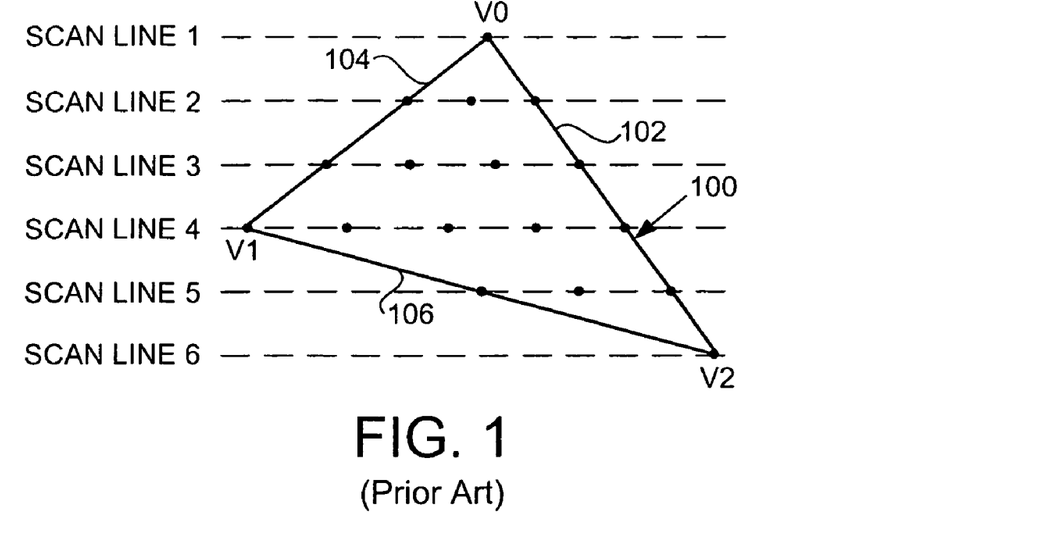
FIG. 1 is a diagram illustrating decomposition using "edge and scan traversal" technique.

An example of the object order rasterization approach involves an "edge and span traversal" technique. As shown in FIG. 1, a triangular graphics primitive 100 has three vertices $V_0$, $V_1$ and $V_2$ and is intersected by a number of horizontal scan lines (i.e., SCAN LINE1 through SCAN LINE6). Assuming the three vertices $V_0$, $V_1$ and $V_2$ of the primitive 100 are known, slopes of edges 102, 104 and 106 of the primitive 100 can be calculated as follows:

$$m = (Y_e - Y_s)/(X_e - X_s) \quad (1)$$

where $(X_s, Y_s)$ and $(X_e, Y_e)$ are any two vertices of the primitive 100. Starting from a chosen vertex, intersecting points between the edges 102, 104 and 106 of the primitive 100 and horizontal scan lines can be incrementally determined from a corresponding calculated slope value together with a known distance between any two horizontal scan lines under equation (1). By using corresponding intersecting points as starting and end points of intersecting horizontal scan lines, interior points of the primitive 100 can be determined by traversing scan line segments. Additionally, corresponding information on color, depth and texture for each rasterized pixel point may be determined by interpolation based on values at the vertex.

Disadvantageously, determining the three edge slopes in equation (1) requires three separate arithmetic divisions. Further, in traversing the scan line segments, another arithmetic division may be required to determine the traversing increment. In addition to requiring an extra accumulator register, arithmetic division calculations are generally slow. As such, rasterizing using the "edge and span traversal" technique is not the most efficient approach.

Figure 2:
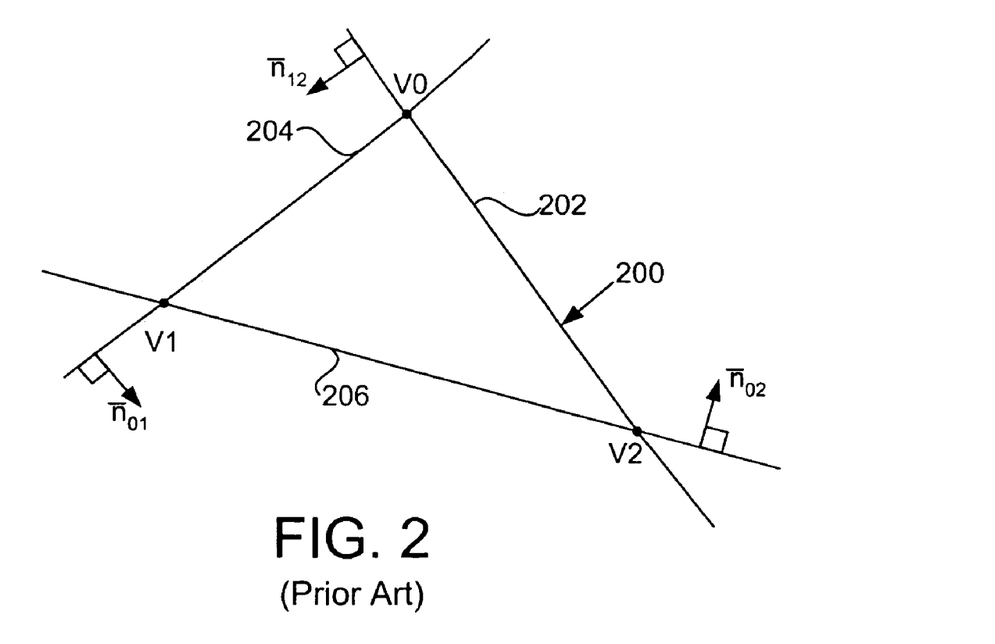
FIG. 2 is a diagram illustrating decomposition using "edge function" technique.

An example of the image order rasterization approach involves an edge function technique, as will be described in connection with FIG. 2. Under the edge function technique, an edge function is generated for each of three edges 202, 204 and 206 of an exemplary graphics primitive 200. The edge function is then used to determine whether a pixel is located inside or outside of the primitive 200. A pixel is at least partly inside the primitive 200 if values of all three edge functions are positive. Otherwise, the pixel is outside of the primitive 200. In FIG. 2, the primitive 200 has three vertices $V_0$, $V_1$ and $V_2$. Assuming the three vertices $V_0$, $V_1$ and $V_2$ are known, a locus of points on an edge must satisfy the follow equation:

$$n \cdot (x - x_0) = 0 \quad (2)$$

where n is a vector normal to the edge and x and $x_0$ are points on the edge.

For the edge 204 connected between vertex $V_0$ (having coordinates $(x_0, y_0)$) and $V_1$ (having coordinates $(x_1, y_1)$), the normal vector $n_{01}$ is:

$$n_{01} = (y_1 - y_0)i + (x_0 - x_1)i \quad (3)$$

Substituting equation (3) for $n_{0I}$ and the vertex $V_0$ $(x_0, y_0)$ into equation (2), edge function $e_{0I}(x, y)$ for the edge 204 can be obtained where:

$$e_{0I}(x, y) = (x_1 y_0 - x_0 y_1) + (y_1 - y_0)x + (x_0 - x_1)y \quad (4)$$

Similarly, for edge 206 between $V_1$ (having coordinates $(x_1, y_1)$) and $V_2$ (having coordinates $(X_2, y_2)$) and the edge 202 between vertex $V_0$ (having coordinates $(x_0, y_0)$) and $V_2$ (having coordinates $(x_2, y_2)$), respective normal vectors $n_{I2}$ and $n_{02}$ are:

$$n_{I2} = (y_2 - y_1)i + (x_1 - x_2)j \quad (5)$$

$$n_{02} = (y_2 - y_0)i + (X_0 - X_2)j \quad (6)$$

Substituting equation (5) and the vertex $V_2$ $(x_2, y_2)$ into equation (2), and substituting equation (6) and the vertex $V_0$ $(x_0, y_0)$ into equation (2), edge function $e_{I2}(x, y)$ for the edge 206 and edge function $e_{02}(x, y)$ for the edge 202, respectively, can be obtained. Edge functions $e_{I2}(x, y)$ and $e_{02}(x, y)$ are shown below.

$$e_{I2}(x,y) = (x_{12} y_1 - x_1 y_2) + (y_2 - y_1)x + (x_1 - x_2)y \quad (7)$$

$$e_{02}(x,y) = (x_2 y_0 - x_0 y_2) + (y_2 - y_0)x + (X_0 - x_2)y \quad (8)$$

By computing the values of edge functions (4), (7) and (8) at a desired pixel point, a determination can be made as to whether the pixel point lies inside or outside of the primitive 200. For simplicity, edge functions (4), (7) and (8) can be made into a more generic function:

$$e(x,y) = e_0 + n_x x + n_y y \quad (9)$$

where $e_0$ is a constant, $n_x$ is the x-component of the normal vector n, and $n_y$ is the y-component of the normal vector n.

The edge function technique can also be extended to attributes such as depth, color, transparency and texture. For example, in a depth (z) case, locus of points on a plane must satisfy the following equation:

$$n \cdot (x - x_0) = 0 \quad (10)$$

where n is a vector normal to an edge, and x and $X_0$ are points on a plane.

Assuming three points $x_0, x_1$ and $x_2$ on a plane are known, the vector n normal to the plane can be determined using the following equation:

$$n = (x_2 - x_1)(x_1 - x_0) \quad (11)$$

or $$n = ((y_2 - y_1)(z_1 - z_0) - (y_1 - y_0)(z_2 - z_1))i +$$

$$((z_2 - z_1)(x_1 - x_0) - (z_1 - z_0)(x_2 - x_1))j +$$

$$((x_2 - x_1)(y_1 - y_0) - (x_1 - x_0)(y_2 - y_1))k \quad (11)$$

By substituting equation (11) into equation (10), z can be determined based on the following equation:

$$z(x, y) = (n \cdot x_0)/n_z - (n_x/n_z)x - (n_y/n_z)y \quad (12)$$

where $n_x$ is the x-component, $n_y$ is the y-component, and $n_z$ is the z-component of the normal vector n. As such, the depth z is a function of (x, y). Once the attributes values (e.g., color, transparency, and texture) at the primitive vertices have been determined, the attribute values at rasterized pixel points can be interpolated using equation (12).

Conventionally, the edge function technique requires the raster screen to be broken up into chunks of equal-sized (e.g., 32×32 pixels) which are individually examined relative to each primitive. The raster screen is broken up in order to reduce memory requirements. This reduction is important given that an external memory is typically used as the frame buffer. However, before a chunk is rasterized, a preliminary test is performed to determine whether the primitive intersects a current raster chunk. By performing this test, an entire raster chunk can be eliminated without having to examine each pixel if there is no intersection between the raster chunk and the primitive. The preliminary test involves examining a bounding-box coverage area or calculating a chunk-to-edge distance.

Generally, the bounding-box coverage test determines whether a rectangle (having horizontal and vertical edges) that bounds vertices of a primitive intersects with a current raster chunk. The bounding-box coverage test can be inexact because while the bounding-box may intersect a chunk, the primitive may not. Alternatively, the chunk-to-edge distance test computes a distance from a center of a current chunk to each edge of a primitive. If the distance to a closest edge is less than or equal to one-half (½) the width of the chunk (e.g., 16 pixels in this example), the primitive intersects the current chunk. Although more exact, the chunk-to-edge test requires more processing due to arithmetic multiplication and addition operations to compute Pythagorean distances.

Figure 3:
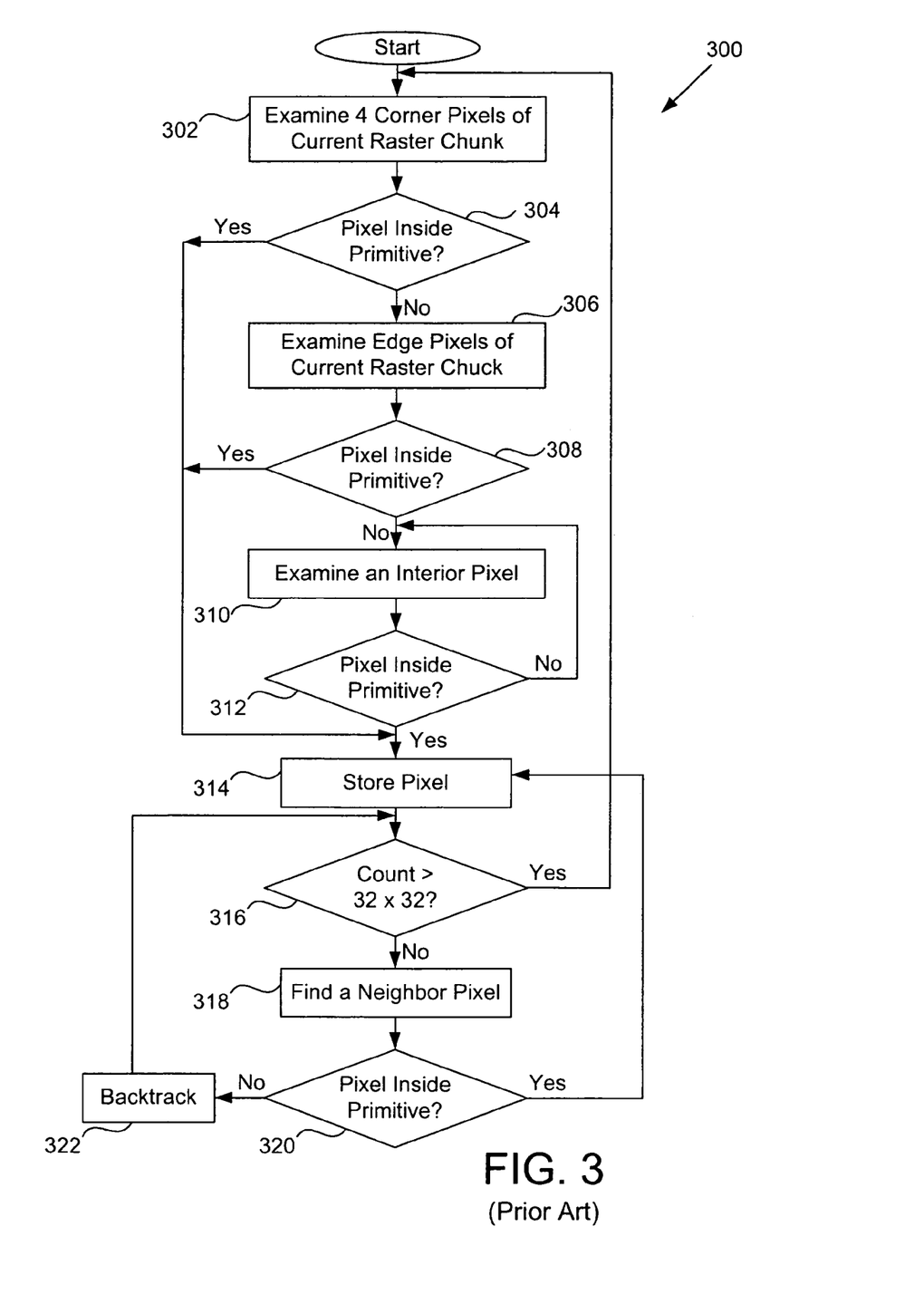
FIG. 3 is a flowchart of a conventional implementation of the "edge function" decomposition technique.

FIG. 3 is a flowchart 300 illustrating decomposition steps for each raster chunk according to the conventional approach. First in step 302, corner pixels of the raster chunks are examined to determine if a pixel lies inside a graphic primitive. If a pixel is inside the primitive in step 304, then the pixel is stored (step 314). Next in step 316, a total number count of pixels examined is checked to determine if all pixels in the chunk have been examined. If all pixels have been examined, then rasterization of the chunk is complete and a next chunk will be examined. However, if pixels still need to be examined, then in step 318, a search for a neighbor pixel is conducted, and the neighboring pixel is examined to determine if the pixel lies inside the primitive in step 320. The pixel will be stored if it lies inside the primitive. Otherwise, an effort is made to get back inside the primitive by backtracking in step 322.

Alternatively, if no corner pixel is found inside the primitive in step 304, then in step 306, pixels along each edge of the chunk are examined. If a pixel is found to be located within the primitive in step 308, then the pixel is stored in step 314. Alternatively, if no pixel is found within the primitive, a heuristics analysis is performed to choose an interior pixel for examination in step 310. Once again, if the pixel is inside the primitive, it is stored in step 314 and steps 316, 318, 320 and 322 are performed as discussed above. Otherwise, another interior pixel is selected until a pixel lying inside the primitive is found.

Conventional implementation of the edge function technique in decomposing primitives relies heavily on heuristics to, first, find a pixel lying inside the primitive. Upon finding such a pixel, the pixel's successive neighboring pixels are incrementally examined using edge functions to find other pixels that lie inside the primitive. Such searching may be intermittently interrupted for backtracking as a result of straying outside the primitive. Thus, this conventional implementation is rather ad-hoc and may not be effective. Moreover, because the conventional approach is inherently sequential (i.e., one pixel is examined at a time), it is not the most efficient technique given the large number of pixels in each chunk.

Therefore, there is a need for a system and method that allows a primitive to be decomposed into pixels more efficiently.

SUMMARY OF THE INVENTION

The present invention advantageously provides a system and method that allows graphic primitives to be efficiently decomposed. In one embodiment, a graphics engine includes a predetermined number of sequential logic circuits and parallel logic circuits connected together to form a pipeline structure. This pipeline structure receives information related to polygonal portions of a raster image from memory and information related to primitives from a source. The pipeline structure subsequently determines whether a polygonal portion of the raster image is at least partially inside the primitive. If the polygonal portion is partly inside, the pipeline structure divides the polygonal portion into a predetermined number of polygonal subportions.

The pipeline structure then determines whether the polygonal subportion is at least partially inside the primitive. If the subportion is partly inside the primitive and the polygonal sub-portion is larger than a pixel, the pipeline structure divides the polygonal subportion further into a predetermined number of subportions. The process is repeated for each subportion until there are no more subportions partially located inside the primitive.

DESCRIPTION OF EXEMPLARY EMBODIMENTS

Figure 4:
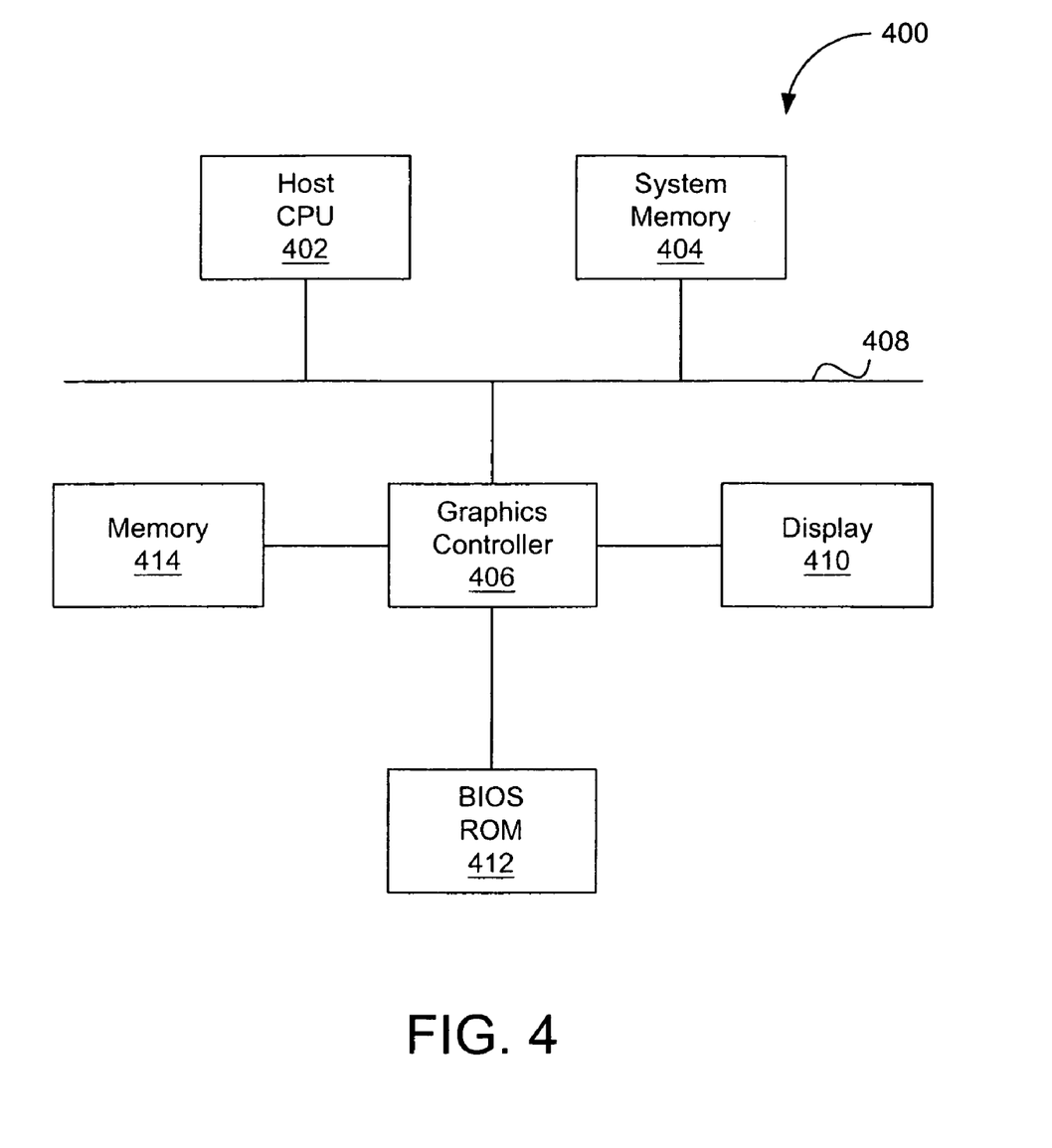
FIG. 4 is a block diagram of a computer system, according to the present system and method.

FIG. 4 is a block diagram of a computer system 400 for implementing the present system and method. The computer system 400 includes a central processing unit (CPU) 402, a system memory 404, and a graphics controller 406, all of which are coupled to a system bus 408. The system bus 408 may be any one of a number of different types of host or input/output (I/O) buses, including industry standard architecture (ISA), extended ISA (EISA), peripheral component interconnect (PCI), video electronic standard association (VESA) local bus, or any other standardized computer system bus. The system bus 408 may also be an accelerated graphics port (AGP).

The system memory 404 stores information, instructions, and software programs such as an application program, a graphics subroutine package and an operating system executable by the CPU 402. The application program may be used to construct two and three-dimensional graphics images and models. These images and modules are data structures defining primitives (e.g., points, lines, polygons) that define a shape of the image, attributes such as color or surface textures, and connectivity relationships that describe interconnection of components. The graphic images and models may be stored in a database or memory space associated with the system memory 404. The graphics subroutine package may include software algorithms such as those used to perform geometric transformations (e.g., translations, scaling and rotation) and view projections of the graphics images and models. For example, a two-dimensional rendition of a three-dimensional object is created by moving the object to a desired position, rotating the object to a desired orientation, and scaling the object to the desired size.

The graphics controller 406 processes the two and three dimensional graphics, text and windowing operations of the computer system 400. The graphics controller 406 is further coupled to a display device 410, a basic input/output system read only memory (BIOS ROM) 412 and memory 414. In one embodiment, the memory 414 is a video random access memory (VRAM). Alternatively, other forms of memories such as SDRAM, WRAM, EDORAM, and RDRAM may be utilized. The memory 414 stores data and software programs executable by the graphics controller 406 to perform primitive rasterization. Memory 414 may also function as a frame buffer for storing displayable raster images created by rasterization operations. More particularly, the frame buffer in the memory 414 contains a bitmap/pixmap of an entire monitor screen at any one time. Raster images may be retrieved from the memory 414 by the graphics controller 406 and sent to the display device 410.

BIOS ROM 412 stores a set of routines what are used to ensure hardware compatibility between the computer system 400 and input/output (I/O) devices such as video displays, communication devices, printers and keyboards. More particularly with regard to graphics, BIOS ROM 412 permits implementation of standard video modes (e.g., enhanced graphics adapter (EGA) or video graphics array (VGA)).

Figure 5:
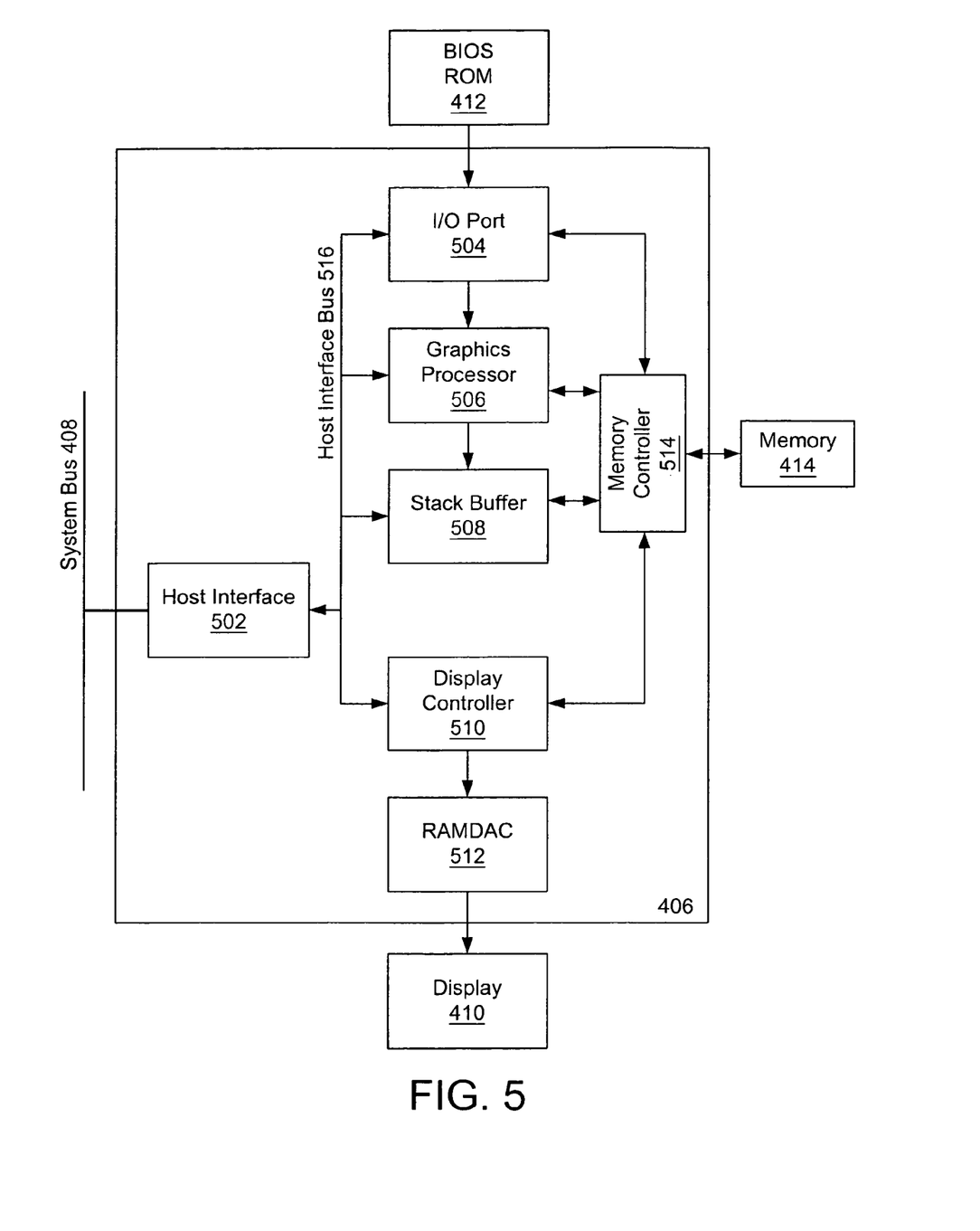
FIG. 5 is a block diagram of the graphics controller of FIG. 4.

Referring now to FIG. 5, a block diagram of one embodiment of the graphics controller 406 is shown. The graphics controller 406, typically, includes a host interface 502, I/O port 504, graphics processor 506, stack buffer 508, display controller 510, random access memory digital-to-analog converter (RAMDAC) 512, and memory controller 514. The graphics controller 406 may also include a host interface bus 516, stack buffer 508 and display controller 510. The memory controller 514 is coupled to I/O port 504, graphics processor 506, stack buffer 508, display controller 510, and memory 414 such that memory controller 514 controls access to memory 414. Graphics processor 506 is further coupled to stack buffer 508 which temporarily stores results of rasterization in an easy traversal and retrieval form.

The host interface 502, which is coupled between the system bus 408 and the host interface bus 516, arbitrates with the CPU 402 (FIG. 4) for control of the system bus 408. The host interface 502 also determines whether graphics controller 406 is a target of a transaction on the system bus 408, and controls access by I/O port 504, graphics processor 506 and display controller 510 to host interface bus 516.

Upon receiving a command from the CPU 402 via the host interface 502, the graphics processor 506 accesses a rasterization software algorithm from the memory 414 via the memory controller 514. Additionally, the graphics processor 506 receives data from the CPU 402 (e.g., primitive vertices) and memory 414 (e.g., tile corner coordinates). Using this received data as parameters, the graphics processor 506 executes the rasterization software. As will be discussed in more detail in connection with FIGS. 6–10, the rasterization software evaluates primitive edge functions at each corner of a "tile" (i.e., polygonal portion of a screen) to determine whether the tile is contained within a primitive. In one embodiment, if the tile is located within the primitive, then the tile is divided into a predetermined number of subtiles (i.e., subdivision or subportions) and decomposition is repeated relative to the subtiles. Accordingly, unless a tile or subtile is found inside a primitive, the subdivision process for that particular tile/subtile is not carried out, resulting in reduced processing time. The subdivision process is also stopped when a subtile is equal in size to a pixel, which is the smallest element of a raster image.

Thus, primitives can be decomposed efficiently into pixels to form a bitmap/pixmap. Attributes (e.g., depth, color, shade and texture) of pixels may then be computed by interpolation to complete the rasterization process. Typically, additional software stored in memory 414 may be used to compute the attributes of the pixels located inside the primitive. After the primitives of a raster image are decomposed, the bitmap/pixmap is moved from the stack buffer 508 to the frame buffer in memory 414.

In addition to being connected to the host interface bus 516, the display controller 510 is also connected to the memory controller 514 and RAMDAC 512. The display controller 510 handles all display screen refresh activities and generates monitor timing signals HSYNC and VSYNC. Additionally, the display controller 510 retrieves raster image bitmap from the memory 414 via the memory controller 514 and delivers the data in a desired sequence to RAMDAC 512 for screen refresh. RAMDAC 512 further includes color look-up tables and a digital-to-analog (D/A) converter in order to provide analog signals to the display device 410 (e.g., CRT and LCD display devices).

Figure 6A:
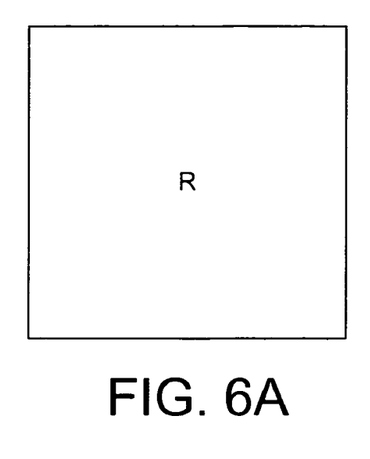
FIG. 6A is a block diagram of a tile R inside a primitive.
Figure 6B:
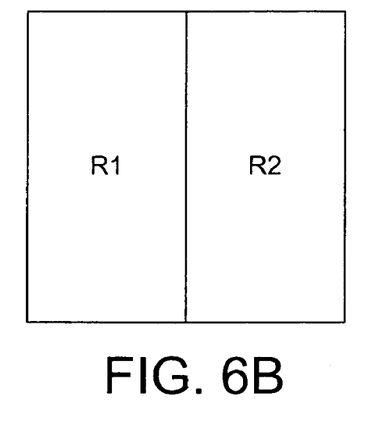
FIG. 6B is a block diagram of the tile R divided into subtiles R1 and R2.
Figure 6C:
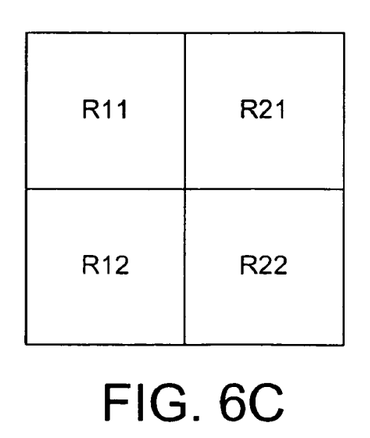
FIG. 6C is a block diagram of subtiles R1 and R2 subdivided into subtiles R11, R12, R21 and R22.

Referring now to FIGS. 6A–C, a recursive subdivision process is described. In an exemplary embodiment, a tile R (FIG. 6A) is deemed inside a primitive and is subsequently divided into two subtiles R1 and R2 as shown in FIG. 6B. Although the exemplary embodiment divides into two subtiles, a tile/subtile may be divided into any predetermined number of subtiles. Further assume in the exemplary embodiment that the two subtiles R1 and R2 are also determined to be inside the primitive. Thus, subtile R1 is further divided into subtiles R11 and R12, and subtile R2 is divided into subtiles R21 and R22 as shown in FIG. 6C.

Figure 7:
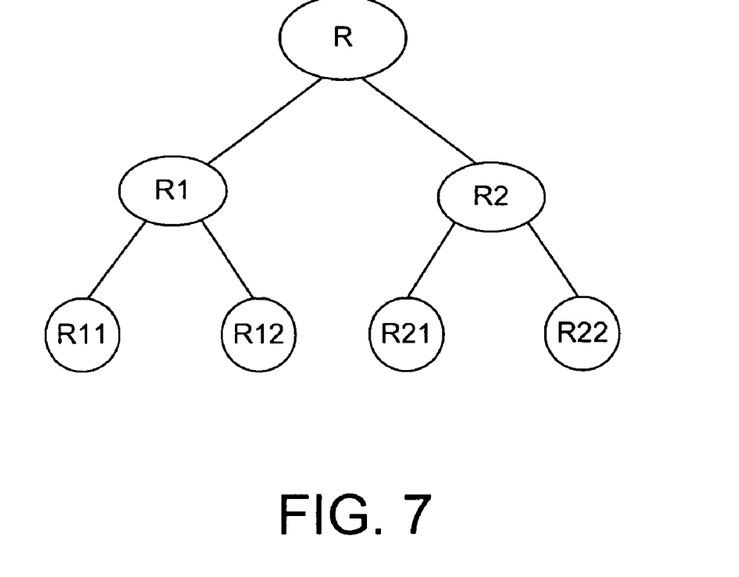
FIG. 7 is a diagram of a tree-line hierarchical data structure used in linking together tiles and subtiles, according to the present system and method.

Tile R, subtiles R1 and R2, and subtiles R11,R12,R21 and R22 may be conveniently organized and linked together in a tree-like hierarchical data structure as shown in FIG. 7. This exemplary data structure includes three levels, although alternative structures having more or less levels are contemplated. The top level of the exemplary data structure is a node representing tile R. Tile R is a parent node to nodes R1 and R2 which comprise a second level of the exemplary data structure. Subsequently, nodes R1 and R2 are parent nodes to two children nodes (e.g., R11 and R12 for node R1; R21 and R22 for node R2). These children nodes comprise the third level of the exemplary data structure.

Thus during decomposition, data associated with a tile/subtile (e.g., whether the tile/subtile is inside a primitive or whether a tile/subtile has been examined) are assembled in the tree-like data structure of FIG. 7. In doing so, data associated with each tile/subtile can be monitored by traversing the hierarchical data structure. This data structure may be stored in the stack buffer 508 (FIG. 5) in which data is transferred to and from in a predetermined order. Accordingly, the stack buffer 508 may be a last-in-first out (LIFO) or a first-in-last-out (FILO) buffer.

Figure 8:
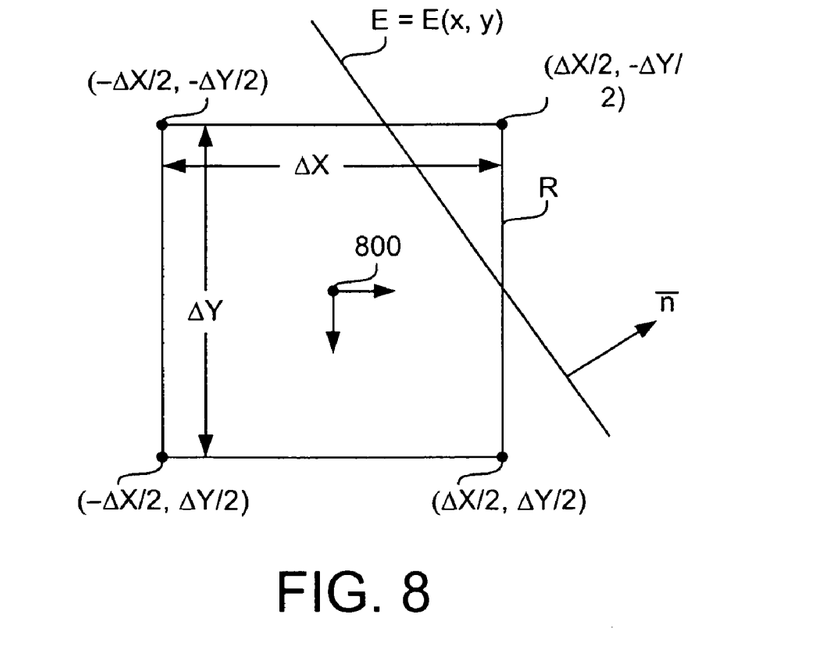
FIG. 8 is a diagram of an edge E of a graphics primitive intersecting a tile R.

FIG. 8 illustrates one aspect of the present system and method in which each corner of a tile R is examined in order to determine if the tile R is entirely outside a primitive, and thus may be disregarded. In FIG. 8, edge E of the primitive is shown intersecting tile R having a width $\Delta X$ and a height $\Delta Y$. In this exemplary embodiment, remaining edges of the primitive are not shown in FIG. 8 in order to simplify FIG. 8. A point is inside a primitive edge if the point's edge function value is positive. Consequently, a point is inside a primitive if values of all edge function values are positive. Thus for a triangular primitive, all three edge functions must be positive for a point to be contained within the triangular primitive.

In accordance with an embodiment of the present system and method, the edge function is used to determine if a tile is inside or entirely outside of a primitive. Using the general edge equation $e(x, y)=e_0+n_x x+n_y y$ (equation (9) above), the edge function $E(x, y)$ is evaluated at each of the four corners of tile R. If at least one corner is determine to be inside the primitive, then tile R is deemed to be at least partly inside the primitive. Otherwise, tile R is entirely outside the primitive and will be ignored in accordance with the present system and method.

However, a situation may arise where only one tile corner is inside the primitive. This situation will require many edge function calculations to determine the tile corner. The present system and method minimizes edge function evaluations by recognizing that a tile is at least partly inside the primitive if for each edge, the tile corner that is farthest (relative to other corners) in a positive direction from the edge is inside the edge. An edge function evaluated at the tile corner that is farthest in the positive direction from an edge has the largest value compared to values of the same edge function evaluated at other tile corners.

To determine the tile corner farthest in the positive direction from the edge without having to perform the edge function, steps are taken to advantageously use a tile's symmetry. By placing a reference coordinate system at a center of the tile, the general edge function $e(x, y)=e_0+n_x x+n_y y$ (equation (9)), provides a largest positive value when the terms $n_x x$ and $n_y y$ are absolute numbers given that $e_0$ is a constant. Thus in FIG. 8, a reference coordinate system 800 is placed in a center of tile R. Subsequently, coordinates of the four corners of tile R are $(-\Delta X/2, -\Delta Y/2)$, $(\Delta X/2, -\Delta Y/2)$, $(-\Delta X/2, \Delta Y/2)$ and $(\Delta X/2, \Delta Y/2)$. As such, regardless of whether actual values of $n_x$ and $n_y$ are positive or negative, there exists a tile corner having a coordinate combination such that when the terms $n_x x$ and $n_y y$ are computed, results are positive. Given that the term $e_0$ is a constant, having positive terms $n_x x$ and $n_y y$ results in the largest value for an edge function. Accordingly, the edge function at the tile corner that is farthest in the positive direction from an edge can be evaluated by performing only one calculation.

The above calculation may be simplified even more by insuring that the tile's width $\Delta X$ and height $\Delta Y$ are two-to-the-$n^{th}$-power ($2^n$) numbers which allow terms $n_x x$ and $n_y y$ to be calculated by simply shifting $n_x$ and $n_y$. Thus, in the exemplary embodiment of FIG. 8, assume that tile R has a dimension of 32×32 pixels (i.e., ΔX is equal to $2^5$ pixels and ΔY is equal to $2^5$ pixels). Accordingly, ΔX/2 and ΔY/2 are equal to $2^4$, and the terms $n_x x$ and $n_y y$ can be calculated by shifting $n_x$ and $n_y$ left four times. Therefore, the edge function can be evaluated by a few shift and addition operations.

As previously discussed, one embodiment of the present system and method decomposes primitives into pixels by determining whether tiles representing a portion of a screen is located inside the primitive. If at least a part of the tile lies within a primitive, the tile is divided and the determination process is repeated until each subtile is the size of a pixel. Accordingly, each time a determination is made as to whether a subtile is located inside a primitive, the reference frame 800 must be relocated to the center of the subtile being examined in order to use the simplified calculation discussed above. Thus, a new set of edge function equations taking into consideration an offset distance has to be determined. This new set of edge function equations can be derived in the following manner. First, assume an origin of a subtile reference frame has coordinates (dx, dy) relative to an origin of an "absolute" reference frame (i.e., the origin of the subtile reference frame is offset a distance dx in a x-direction and a distance dy in a y-direction from the origin of the absolute reference frame). An edge function e' (x', y') taking into consideration the offset distance dx and dy is equal to:

$$e'(x', y') = e'(x+dx, y+dy) \quad (13)$$

$$e'(x',y') = e_0 + n_x(x+dx) + n_y(y+dy)$$

$$e'(x',y') = e_0 + n_x x + n_x dx + n_y y + n_y dy$$

$$e'(x',y') = (e_0 + n_x x + n_y y) + n_x dx + n_y dy$$

$$e'(x',y') = e(x,y) + n_x dx + n_y dy \quad (13)$$

where $e_0$ is a constant unaffected by the offset, and $n_x$ and $n_y$ are the x and y components of the edge normal vector n.

As such, the offset edge function (e' (x', y') can be derived by adding a few terms to the general edge function e(x, y)=$e_0 + n_x x + n_y y$ (equation (9)). Additionally, because dx and dy are $2^n$ numbers, the terms $n_x dx + n_y dy$ can be determined by shifting $n_x$ and $n_y$ left. Hence, the offset edge function e' (x', y') can be computed by a few addition and shifting operations.

Figure 9:
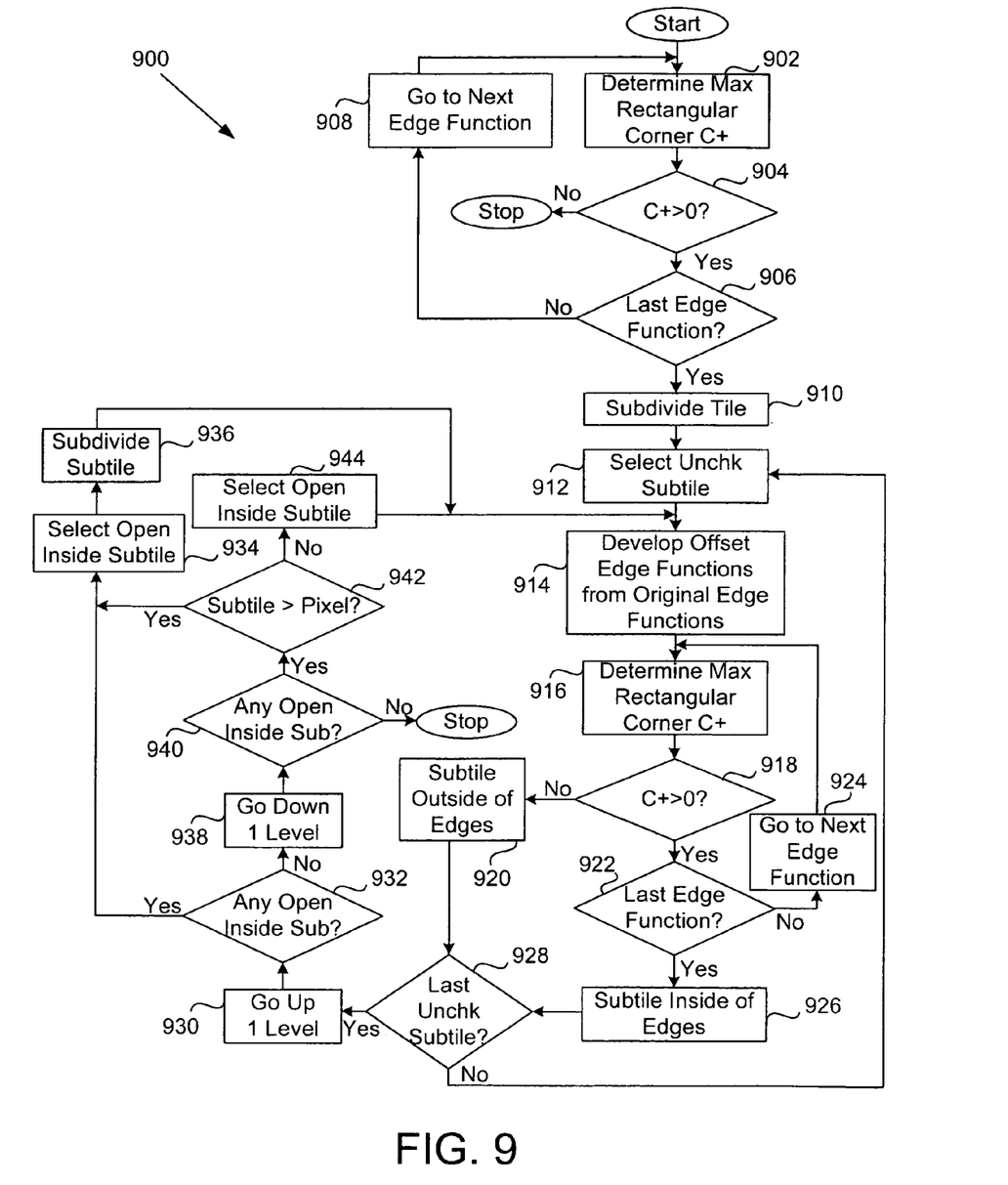
FIG. 9 is a flowchart illustrating operation steps performed by the graphics controller of FIG. 5 to decompose graphics primitives.

FIG. 9 illustrates a flowchart 900 of a method in accordance with one embodiment. Various steps shown in FIG. 9 may be implemented in the instruction codes stored in memory 414 (FIG. 4), which when executed by graphics processor 506 (FIG. 5), carry out the decomposition process. In step 902, primitive vertices and tile corner coordinates received from CPU 402 (FIG. 4) and memory 414, respectively, are used to derive edge functions. One edge function is selected and evaluated at a tile corner that is farthest in a positive direction from a current edge. Next, in step 904, a determination is made as to whether a calculated edge function value is greater than or less than zero (0). If the calculated value is greater than zero, other edge functions are then selected and evaluated until all three edge functions of a primitive have been evaluated in step 906. If and only if all three edge functions for a primitive are greater than zero (0), then a particular tile is at least partly inside the primitive. However, if one of the calculated edge functions is less than zero, the primitive is outside the tile and the whole tile is disregarded. Subsequently, a new tile is requested for decomposition analysis.

Should a tile be determined to be located inside the primitive, the tile is decomposed/subdivided into subtiles in step 910. In order to carry out the subdivision, midpoint coordinates of the tile's two predetermined sides are determined using the tile corner coordinates. In one embodiment, a tile/subtile is subdivided into four subtiles. Thus, a tile is first divided into a left and a right subtile, each of which is subsequently divided into a top and bottom subtile. Thus, the existing tile corner coordinates and the newly derived midpoint coordinates can be used to represent the subdivided subtiles. At this time, the original tile is considered closed because the tile has been decomposed. Although this embodiment contemplates subdividing into fours, a tile may be subdivided into any number of subtiles.

In step 912, one subtile is selected for decomposition. New offset (translated) edge functions are derived from the original edge functions for the selected subtile in step 914. A translated edge function is then selected and evaluated at a tile corner that is farthest in a positive direction from a current edge in step 916. Next in step 918, a determination is made as to whether a calculated (evaluated) value for the edge function is greater or less then zero (0). If the calculated value is greater than zero, other edge functions are selected and evaluated until all three edge functions have been evaluated (steps 918, 922 and 924). If and only if all three edge functions are greater than zero (0), the subtile is considered at least partly inside the primitive, and is marked or classified, accordingly, in step 926. The subtile is further marked as being open to indicate that the subtile has not been further decomposed in step 926. Conversely, if one of the calculated edge functions is determined to be less than zero in step 918, the subtile is classified as outside the primitive. Subsequently, the subtile is disregarded from further decomposition.

After a subtile is classified, a determination is made as to whether all created subtiles have been "checked" to see if the subtiles are inside the primitive in step 928. In doing so, monitoring of subtiles to determine which ones need further decomposition is made easier and more efficient. In the event one or more subtiles remain unchecked, the method loops back to step 912 to select an unchecked subtile to determine the subtile's location relative to the primitive. Otherwise, if all the subtiles in a current level have been checked, the method traverses, in step 930, one level up a search tree representing a status of the tile and subtiles as discussed in connection with FIG. 7. Thus, the present method ensures that all subtiles on a same level are decomposed before subtiles on a next level are decomposed. For efficient stack management, this method is preferred over techniques in which decomposition is performed by selecting a subtile and traversing downward from the particular subtile until leaves of a search tree are reached, at which point the search tree is traversed upward to an open inside subtile at a highest level.

After traversing upward one level, a search for an open inside subtile is performed for the present level in step 932. An open inside subtile indicates that the subtile is at least partly inside the primitive and has not been decomposed/subdivided, as opposed to a closed inside subtile which has been subdivided and should not be subdivided again. If an open inside subtile exists on the current level, it is selected in step 934 and is further decomposed into smaller subtiles in step 936. The method returns to step 914 to determine whether the newly created subtiles are inside of the primitive. The subdivision/decomposition process continues recursively until a subtile is determined to be outside of the primitive or has the size of a pixel.

Alternatively, if in step 932 there is no open inside subtile on the current level, the search tree is traversed downward to a next lower level in step 938. Subsequently, a search for an open inside subtile is carried out for subtiles on this new current level in step 940. If there is again no open inside subtile, the decomposition process stops. Subsequently, a new tile or a new primitive can be required for a new decomposition analysis. However, if an open inside subtile exists, a subtile on the current level is examined to determine if the subtile is larger than a pixel in step 942. This examination is performed to ensure that the subdivision process stops when a subtile is the size of a pixel. Accordingly, if the subtiles on the current level remain larger than a pixel, an open inside subtile is selected in step 934 and subdivided in step 936. The method then loops back to step 914 to continue the decomposition process. Alternatively, if the subtiles on the current level are equal in size to a pixel in step 942, an open inside subtile is selected in step 944 and the method returns to step 914.

Figure 10:
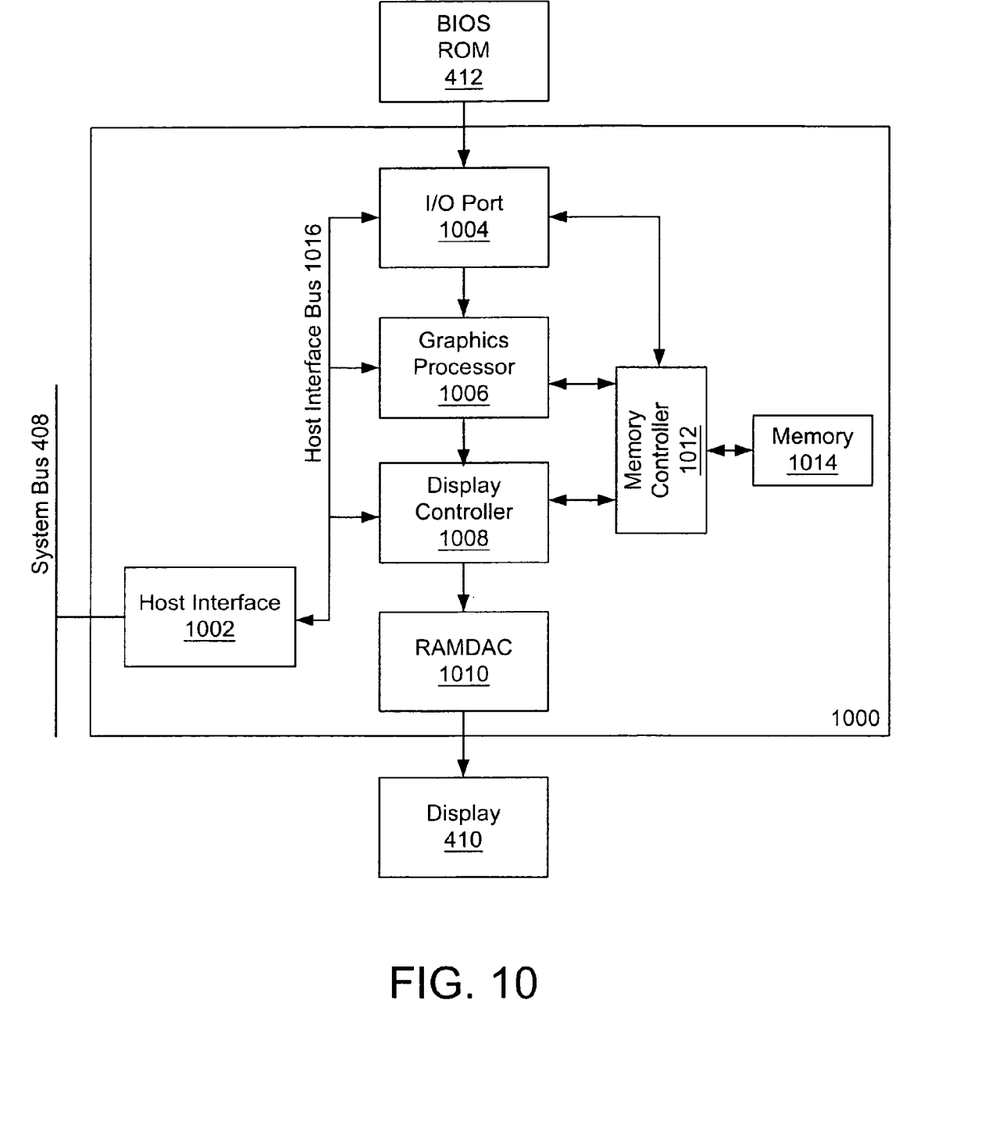
FIG. 10 is a block diagram of an alternative embodiment of the graphics controller of FIG. 4.

FIG. 10 illustrates a block diagram of an alternative embodiment of a graphics controller 1000. Unlike the FIG. 5 embodiment which performs tile subdivision sequentially, this alternative embodiment performs tile subdivision both sequentially and in parallel. As discussed above, a tile located within a primitive is subdivided into a predetermined number of subtiles which are subsequently evaluated to determine whether the subtiles are inside the primitive. If a subtile is deemed inside the primitive, the subtile is further subdivided into a predetermined number of small subtiles, and the process continues recursively until either all subtiles created are outside the primitive or the subtile is the size of a pixel. Accordingly, the current system and method possesses inherent parallel processing characteristics wherein all the subtiles on a same level can be processed (e.g., evaluated and then further subdivided) in parallel. However, performing tile subdivision in parallel, exclusively, may not be feasible if there are volume and cost constraints. For a tile of 32×32 pixels, there must be sufficient hardware to carry out 1024 separate subdivision processes. As a result, it may be desirable to optimize the present system and method based on speed, space and costs. Accordingly, the alternative embodiment of FIG. 10 involves a pipeline structure combining both sequential and parallel subdivision processing.

As shown in FIG. 10, graphics controller 1000 includes a host interface 1002, I/O port 1004, graphics engine 1006, display controller 1008, random access memory digital-to-analog converter (RAMDAC) 1010, memory controller 1012, and memory 1014. Graphics controller 1000, further includes a host interface bus 1016 which couples together the host interface 1002, I/O port 1004, graphics engine 1006, display controller 1008 and memory 1014 such that memory controller 1012 controls access to memory 1014 among the various components.

The embodiment of FIG. 10 is similar to the FIG. 5 embodiment but instead of using an external memory, the alternative embodiment of FIG. 10 has an embedded memory 1014. The embedded memory 1014 is preferable in implementing a parallel decomposition architecture. By having an embedded memory 1014 which includes a frame buffer to store displayable raster images created by rasterization operation, different portions of the raster images can be accessed in parallel. The result is a much more cost effective method because while an external memory requires multiple pins to access multiple corresponding portions of the memory in parallel, an embedded memory requires no pins for parallel access. Consequently, by using an embedded memory 1014, a data path does not need to be limited to avoid prohibitive costs.

Most of the components of the graphics controller 1000 function like their counterparts in the FIG. 5 embodiment. Host interface 1002 is connected between the system bus 408 and the host interface bus 1016 and arbitrates with CPU 402 (FIG. 4) for control of the system bus 408 as well as determining whether graphics controller 1000 is a target of a transaction of the system bus 408. Additionally, the host interface 1002 controls access to the host interface bus 1016 by the I/O port 1004, graphics engine 1006 and display controller 1008.

As will be discussed in more detail in FIG. 11, graphics engine 1006 is a pipeline structure designed to carry out a subdivision process both sequentially and in parallel. In addition to receiving a start command from the CPU 402 via the host interface 1002, graphics engine 1006 also receives data such as primitive edge functions from the CPU 402 and tile corner coordinates from the memory 1014. Graphics engine 1006 performs the subdivision process to decompose the primitive into pixels. Graphics engine 1006 also computes the attributes (e.g., color, transparency, texture) associated with the pixel to complete the rasterization process. Following rasterization, portions of a bitmap/pixmap are transferred to the frame buffer in memory 1014 via the memory controller 1012.

In addition to being connected to the host interface bus 1016, display controller 1008 is connected to the memory controller 1012 and RAMDAC 1010. Display controller 1008 handles all display screen refresh activities and generates monitor timing signals HSYNC and VSYNC. The display controller 1008 retrieves raster image bitmap/pixmap from memory 1014 via the memory controller 1012 and delivers the data in a desired sequence to RAMDAC 1010 for screen refresh. RAMDAC 1010 may include color look-up tables and a digital-to-analog converter to provide signals to a the display device 410. The I/O port 1004 is used to access routines stored in BIOS ROM 412 during initialization, and also functions as a general purpose I/O port.

Figure 11:
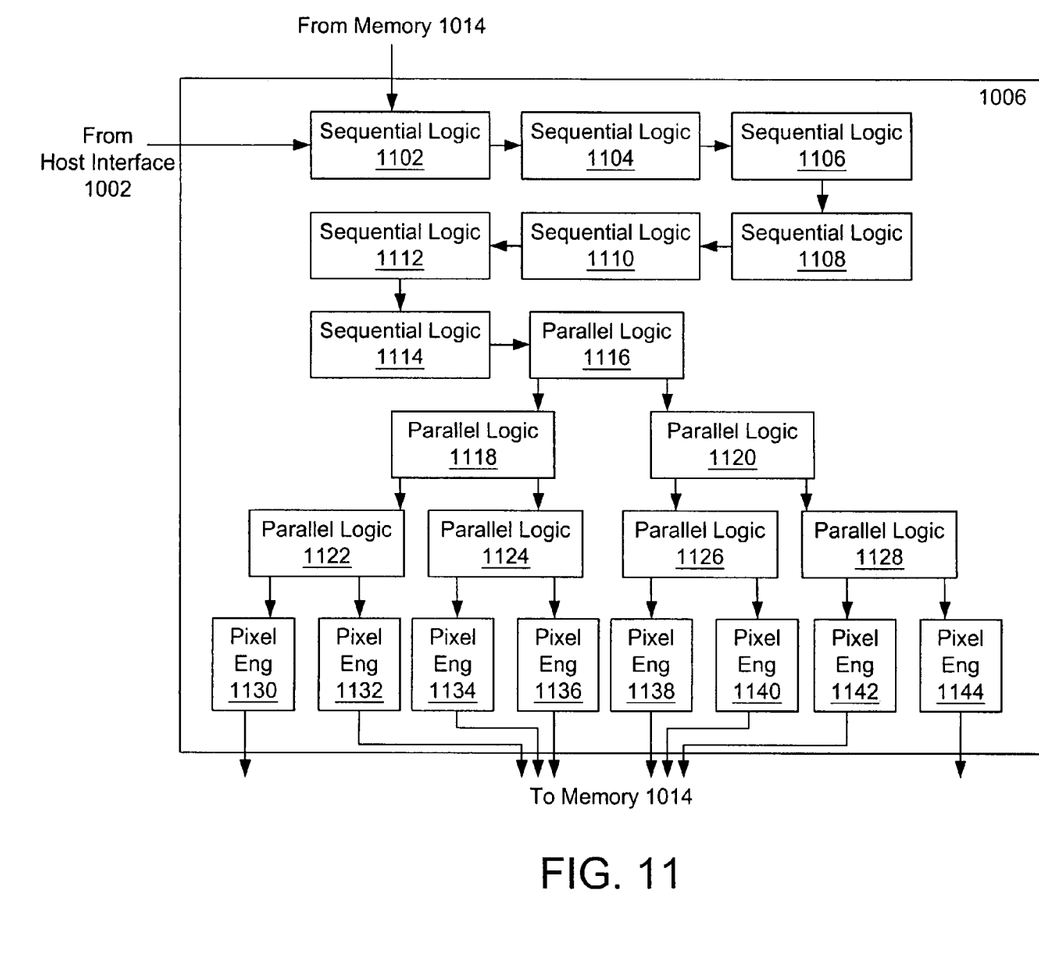
FIG. 11 is a block diagram of the graphics engine of FIG. 10.

FIG. 11 illustrates in more detail a block diagram of graphics engine 1006 of FIG. 10. As shown in FIG. 11, graphics engine 1006 has a pipeline structure that includes seven identical sequential logic circuits 1102 through 1114, seven identical parallel logic circuits 1116 through 1128, and eight identical pixel engines 1130 through 1144. The seven sequential logic circuits 1102 through 1114 are connected in series such that an output of a previous sequential logic is provided as an input for a subsequent sequential logic circuit. In the exemplary embodiment of FIG. 11, an output of sequential logic circuit 1102 is provided as an input for the sequential logic circuit 1104. Further, an output of sequential logic circuit 1114 becomes an input to parallel logic circuit 1116, which subsequently provides two simultaneous outputs to parallel logic circuits 1118 and 1120. In turn, parallel logic circuits 1118 and 1120 each provide two simultaneous outputs to two parallel logic circuits such that four total simultaneous outputs are provided to parallel logic circuits 1122, 1124, 1126 and 1128. Parallel logic circuits 1122, 1124, 1126 and 1128 provide eight simultaneous outputs to eight pixel engines 1130 through 1144.

Each sequential logic circuit uses arithmetic edge functions corresponding to edges of a graphics primitive to determine whether a polygonal portion of a raster image is inside the primitive. If the polygonal portion of the raster image is at least partly inside the primitive, the sequential logic circuit divides the polygonal portion into a predetermined number of subportions and compute descriptors (e.g., vertices and translated edge functions) of each subportion sequentially. Descriptors of the subportions are transferred sequentially to a next stage. Each parallel logic circuit performs the same functions as that of a sequential logic circuit except that a parallel logic circuit computes descriptors of the subportions in parallel and transfers them to the next stage in parallel. The sequential logic circuits, parallel logic circuits, and pixel engines shown in FIG. 11 may be implemented in hardware, software, or firmware to perform various functions described herein.

By implementing a pipeline structure of FIG. 10 in which some subdivisions are carried out in parallel, a number of cycles required to determine whether pixels in a tile are inside or outside a primitive is greatly reduced. For example, instead of requiring as many as 1024 cycles to determine whether all 1024 pixels in a 32×32 tile are inside a primitive, if such evaluations are carried out sequentially, the combination pipeline structure of FIG. 11 allows such evaluations to be made in approximately 138 cycles or less.

The sequential logic circuit 1102 receives as input primitive edge functions and tile corner coordinates from the CPU 402 and memory 1014, respectively. The sequential logic circuit 1102 evaluates the edge functions at each corner of a tile to determine whether the tile is inside of a primitive. This evaluation is carried out according to the discussion corresponding to FIG. 8. If a tile is outside the primitive, the tile is disregarded from subsequent decomposition, and the graphics processor 1006 (via sequential logic circuit 1102), subsequently, receives new corner coordinates for a new tile.

If a tile is determined to be inside the primitive, sequential logic circuit 1102 divides the tile into a predetermined number of subtiles (i.e., subdivisions). In an exemplary embodiment, this predetermined number is two. The division is carried out by computing midpoints of the tile vertices and using the midpoints as vertices for the subtiles. Additionally, sequential logic circuit 1102 updates primitive edge functions for each newly created subtile to reflect an offset of a reference frame from an origin of an absolute reference frame to a center of the subtile. This update is carried out according to the discussion in connection with equation (13).

The vertices and the updated edge functions for the two subdivisions are provided as input to sequential logic circuit 1104, which is identical to sequential logic circuit 1102. Sequential logic circuit 1104 performs subdivision processing on one subtile at a time. Accordingly, sequential logic circuit 1104 only receives the vertices and corresponding updated edge functions for one subtile at a time. By design, a delay is introduced between time information related to a previous subtile and time information related to a next subtile is received by sequential logic circuit 1104. The delay is introduced to ensure that sequential logic circuit 1104 has sufficient time to process information related to the previous subtile received from sequential logic circuit 1102.

Depending on the results of the evaluation of the edge functions at a farthest subtile corner in a positive direction, a determination is made as to whether the subtile is inside the primitive. If a subtile is outside the primitive, the subtile is disregarded from subsequent decomposition. Conversely, if the subtile is inside the primitive, sequential logic circuit 1104 divides the subtile into smaller subtiles and updates primitive edge functions of each newly created subtile. Vertices of each newly created subtile and their corresponding updated edge functions are then sent to sequential logic circuit 1106 for processing. For similar reasoning, a delay is also introduced between time information related to a previous subtile and time information related to a next subtile is received by sequential logic circuit 1106. Upon completion of the evaluation and subdivision process of a subtile, as well as transfer of information related to the subtile, sequential logic circuit 1106 receives the vertices and corresponding updated edge functions of a next subtile from sequential logic circuit 1104. Sequential logic circuit 1106 then performs the evaluation and subdivision process discussed above on the next subtile. Sequential logic circuits 1106 through 1114 are identical to and perform the same functions as sequential logic circuits 1102 and 1104.

As a result, the pipeline structure of graphics engine 1106 incorporates the seven sequential logic circuits 1102 through 1114 to implement in a sequential order the first seven levels of a tree-like data structure. The cascade effect allows each subsequent sequential logic circuit to double the number of subtiles that the previous sequential logic circuit processes. For example, for each tile provided, sequential logic circuit 1102 may sequentially perform subdivision processing and edge functions updating for as many as two (2) subtiles which are, in turn, provided as input to sequential logic circuit 1104. As a result, sequential logic circuit 1104 may sequentially perform subdivision processing for as many as four (4) subtiles which are subsequently provided as input to sequential logic circuit 1106. As such, sequential logic circuit 1106 may sequentially perform subdivision processing for as many as eight (8) subtiles which are, in turn, provided as input to sequential logic circuit 1108. When sequential logic circuit 1114 is reached, sequential logic circuit 1114 may sequentially perform as many as one hundred twenty-eight (128) subtiles analysis.

At this point, information related to the subtiles (e.g., up to 128) is sequentially provided as input to parallel logic circuit 1116. Parallel logic circuit 1116 has twice as much identical hardware than each sequential logic circuits 1102 through 1114, so that parallel logic circuit 1116 can perform a subdivision process (e.g., perform midpoint calculations, update edge functions, etc.) to simultaneously create two subtiles. Accordingly, parallel logic circuit 1116 may provide information related to two newly created subtiles simultaneously as two outputs. In total, parallel logic circuit 1116 may perform subdivision processing for an many as two hundred fifty-six (256) subtiles. However, due to parallel processing capability, the 256 subtiles can be processed in substantially half the time it takes to process the subtiles sequentially.

One output of parallel logic circuit 1116 is supplied as an input to parallel logic circuit 1118 and the other output of parallel logic circuit 1116 is supplied as an input to parallel logic circuit 1120. Parallel logic circuits 1118 and 1120 are identical to parallel logic circuit 1116. Thus, each parallel logic circuit 1118 and 1120 can perform the subdivision process (e.g., perform midpoint calculations, update edge functions, etc.) to simultaneously create two subtiles. Accordingly, parallel logic circuits 1118 and 1120 can each perform subdivision processing for as many as two hundred fifty-six (256) subtiles in substantially half the time it takes to process the subtiles sequentially. Combined, parallel logic circuits 1118 and 1120 can perform subdivision processing for as many as five-hundred twelve (512) subtiles in substantially one-fourth (¼) the time it takes to process the subtiles sequentially.

Outputs of parallel logic circuit 1118 are provided as input to parallel logic circuits 1122 and 1124. Likewise, outputs of parallel logic circuits 1120 are provided as input to parallel logic circuits 1126 and 1128. Parallel logic circuits 1122 through 1128 are identical to parallel logic circuit 1118.

Thus, each of the parallel logic circuits 1122 through 1128 can perform the subdivision process to simultaneously create two subtiles. Accordingly, parallel logic circuits 1122 through 1128 can each perform subdivision processing for as many as two-hundred-fifty-six (256) subtiles in substantially half the time it takes to process the subtiles sequentially. Together, parallel logic circuits 1122 through 1128 can perform subdivision processing for as many as one-thousand-twenty-four (1024) subtiles in substantially one-eighth (⅛) the time it takes to process the subtiles sequentially.

Hence, the three levels involving parallel logic circuits 1116 through 1128 are incorporated into the pipeline structure to reduce the number of cycles required to subdivide a 32×32 tile into 1024 pixels. Additionally, any number of sequential logic circuits and any number of parallel logic circuits can be incorporated into the pipeline structure in graphics engine 1106. In general, more parallel logic circuits translates to faster processing speed, but also may lead to higher costs and a larger footprint.

Outputs of parallel logic circuits 1122 through 1128 are provided as input to pixel engines 1130 through 1144. Pixel engines 1130 through 1144 are used to determine the attributes (e.g., depth, color, shade, texture, etc.) associated with the pixels in order to complete the rasterization process. In general, the attribute values are determined through an interpolation process using known attribute values of primitive vertices. In one embodiment, triangular primitives are chosen for simplicity. Alternatively, any primitive (e.g., lines, polygons, etc.) can be rasterized using the present system and method.

In another embodiment of the present system and method, firmware may be dynamically written into a programmable memory from a remote location. It is also within the scope of the present system and method to implement a program or code that can be stored in an electronically-readable medium to permit a computer to perform any of the methods described herein.

The invention has been described above with reference to specific embodiments. It will be apparent to those skilled in the art that various modifications may be made and other embodiments can be used without departing from the broader scope of the invention. Therefore, these and other variations upon the specific embodiments are intended to be covered by the present invention, which is limited only by the appended claims.

What is claimed is:

1. A system for identifying pixels inside a graphics primitive of a: raster image, the system comprising:
   a memory for storing a raster image; and
   a graphics engine coupled to the memory and comprising a pipeline structure including:
   a sequential logic block comprising a plurality of identical sequential logic circuits coupled in series and including a first sequential logic circuit and a last sequential logic circuit,
   the first sequential logic circuit configured to receive a polygonal portion of the raster image from the memory and to either disregard the polygonal portion if the polygonal portion is outside of the graphics primitive or, if the polygonal portion is at least partly inside the graphics primitive, to subdivide the polygonal portion into equal polygonal subportions and output the polygonal subportions, and
   the last sequential logic circuit configured to receive polygonal subportions, disregard any polygonal subportions thereof that are outside of the graphics primitive, and subdivide a remaining polygonal subportion into further equal polygonal subportions and output those further polygonal subportions; and
   a parallel logic block comprising a plurality of identical parallel logic circuits including:
   a first parallel logic circuit configured to receive the further polygonal subportions output from the last sequential logic circuit, disregard any further polygonal subportions thereof that are outside of the graphics primitive, and subdivide a remaining further polygonal subportion into still further equal polygonal subportions and output those still further polygonal subportions to two next parallel logic circuits operating in parallel.

* * * * *